(12) United States Patent
Schwarz et al.

(10) Patent No.: US 11,804,628 B2
(45) Date of Patent: Oct. 31, 2023

(54) THERMAL MANAGEMENT DEVICE FOR BATTERY

(71) Applicant: CONSTELLIUM SINGEN GMBH, Singen (DE)

(72) Inventors: Kai Schwarz, Gottmadingen (DE); Weiling Wang, Livonia, MI (US); Nicolas Gorse, Paris (FR)

(73) Assignee: CONSTELLIUM SINGEN GMBH, Singen (DE)

( * ) Notice: Subject to any disclaimer, the term of this patent is extended or adjusted under 35 U.S.C. 154(b) by 308 days.

(21) Appl. No.: 17/040,609

(22) PCT Filed: Apr. 10, 2019

(86) PCT No.: PCT/EP2019/059022
§ 371 (c)(1),
(2) Date: Sep. 23, 2020

(87) PCT Pub. No.: WO2019/197436
PCT Pub. Date: Oct. 17, 2019

(65) Prior Publication Data
US 2021/0119280 A1 Apr. 22, 2021

(30) Foreign Application Priority Data
Apr. 11, 2018 (EP) .................................... 18166888

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/625* (2015.04);
(Continued)

(58) Field of Classification Search
CPC ........... H01M 10/6556; H01M 10/613; H01M 10/625; H01M 10/6554; H01M 10/659
See application file for complete search history.

(56) References Cited

U.S. PATENT DOCUMENTS

| 8,936,864 B2 | 1/2015 | Yang et al. |
| 2015/0034287 A1 | 2/2015 | Otto et al. |

(Continued)

FOREIGN PATENT DOCUMENTS

| DE | 10 2010 005 097 A1 | 7/2011 |
| EP | 2 696 433 A1 | 2/2014 |
| KR | 2016-0048564 A | 5/2016 |

OTHER PUBLICATIONS

International Search Report, dated Jun. 17, 2019, corresponding to International Application No. PCT/EP2019/059022.

*Primary Examiner* — Karie O'Neill Apicella
(74) *Attorney, Agent, or Firm* — LADAS & PARRY LLP; Malcolm J. MacDonald

(57) ABSTRACT

An object of the invention is a thermal management device (1) for a battery, including an extruded plate (2). The extruded plate (2) comprises a first channel (13) and a second channel (23), configured to allow a flow of a coolant. The extruded plate (2) also includes at least one encapsulation cavity (33), intended to be filled by a Phase Change Material. The first channel, the second channel and the encapsulation cavity extend between a front face (10) and a rear face (20) of the extruded plate (2). The device comprises an inlet/outlet cap (40), connected to the front face (10) and a diverting cap (50,50'), connected to the rear face (20). Both caps provide plugs of each encapsulation cavity. The diverting cap forms a connecting channel (52$_i$,52$_s$), connecting the first channel (13) to the second channel (23).

15 Claims, 5 Drawing Sheets

(51) Int. Cl.
*H01M 10/625* (2014.01)
*H01M 10/6554* (2014.01)
*H01M 10/659* (2014.01)

(52) U.S. Cl.
CPC ..... *H01M 10/659* (2015.04); *H01M 10/6554* (2015.04); *H01M 2220/20* (2013.01)

(56) References Cited

U.S. PATENT DOCUMENTS

| | | |
|---|---|---|
| 2016/0006088 A1 | 1/2016 | Boetcher et al. |
| 2016/0204486 A1* | 7/2016 | Kenney ................... F28F 1/022 29/890.03 |
| 2018/0238642 A1* | 8/2018 | Seki .................... H01M 10/613 |

* cited by examiner

THERMAL MANAGEMENT DEVICE FOR BATTERY

This is a 371 of International Application No. PCT/EP2019/059022, filed Apr. 10, 2019, which claims priority to European Patent Application No. 18166888.0, filed Apr. 11, 2018.

FIELD OF THE INVENTION

The present disclosure relates to a thermal management device for energy storage systems, such as batteries used in hybrid or electric vehicles.

BACKGROUND OF THE INVENTION

The advance of hybrid or electric vehicles is accompanied with significant developments in batteries or battery accessories. In order to protect the batteries, they are mounted into a protective enclosure, designated by the term battery box. The aim of a battery box is to ensure the tightness, to prevent water ingress and any leakage of electrolytes to the outside, and to protect the battery against impacts in an event of crash. A battery box has to reconcile a low weight, solidity as well as a simple manufacture. To make a battery box, aluminium is an interesting material, because of it offers a good compromise between mechanical property, lightweight, thermal conductivity and low cost.

It is known that the performance of batteries is optimum in a certain temperature range. For this, batteries are usually associated with a thermal management system, aiming and ensuring that the battery temperature is maintained in a suitable temperature range, typically from 25° C. to 40° C. For this, extruded plates, also called cold extruded plates, or cold plates made of brazed sheets through which a coolant can circulate, can be used. Such an extruded plate is for example described in US2016/0006088 or in U.S. Pat. No. 8,936,864. In these documents, the use of Phase Change Materials (PCM) is added into the cooling device. These materials have a relatively low melting point. When the temperature reaches this melting point, the PCM materials absorbs thermal energy thanks to the phase change and thus ensures temperature stability for the Battery cells. The PCMs are generally used by being sealingly encapsulated cavities. Machining a fluid circuit in a cold extruded plate can turn out to be expensive and ensure a leak tight braced channel can't be guaranteed. So is the formation of cavities intended to encapsulate PCMs. But, important elements associated with the manufacture of thermal management systems of batteries are cost, robustness and simple manufacture.

The inventors have designed a device, intended to a thermal management system, which is robust and the manufacturing cost of which is low. Because of its simple design, the device is adapted to mass production, according to industrial manufacturing rates.

DISCLOSURE OF THE INVENTION

A first object of the invention is a thermal management device, intended to be used in a battery box, the device comprising at least one extruded plate, extending, along a longitudinal axis, between a front face and a rear face, the extruded plate including:
  a first channel, extending between the front face and the rear face, between a first front aperture and a first rear aperture;
  a second channel, extending between the front face and the rear face, between a second front aperture and a second rear aperture;
  the first channel and the second channel being intended to form a fluid circuit in which a coolant flows;
  at least one encapsulation cavity, extending between the front face and the rear face, the encapsulation cavity being intended to encapsulate a phase change material;
the device also including:
  an inlet/outlet cap, including at least one plug, inserted into an encapsulation cavity, or into each encapsulation cavity at the front face;
  a diverting cap, preferably including at least one plug, inserted into an encapsulation cavity, or into each encapsulation cavity at the rear face;
  the diverting cap forming a connecting channel, connecting the first rear aperture to the second rear aperture, so as to connect the first channel and the second channel, such that the coolant can flow between the first front aperture and the second front aperture, successively through the first channel, the connecting channel and the second channel.

Preferably, the first channel and the second channel extend, in the extruded plate, along a rectilinear direction, in parallel to the longitudinal axis.

Preferably, the inlet/outlet cap includes a fluid connector engaged in the first front aperture, permitting to connect the first channel with an upstream fluid circuit, and a fluid connector engaged in the second front aperture permitting to connect the second channel with a downstream fluid circuit.

In one embodiment,
  at least one plug, inserted into an encapsulation cavity, extends, along the longitudinal axis, between a first end and a second end, the plug including, between the first end and the second end, a recess;
  the extruded plate includes an inlet aperture, opening into the recess of the plug, and forming an adhesive inlet;
  such that the adhesive extends, around the plug, in the recess, so as to assemble the plug to the extruded plate.

In this embodiment, the extruded plate may include a discharge aperture, opening into the recess of the plug, so as to allow adhesive discharge. The diameter (or the diagonal) of the discharge aperture is preferably lower than the diameter (or the diagonal) of the inlet aperture. Preferably, the recess forms an acute angle with respect to the longitudinal axis. The plug may include at least one auxiliary recess, extending around the plug, between the recess and the first end or between the recess and the second end.

In one embodiment,
  the extruded plate includes a rear chamber, extending between the rear face and the first rear aperture as well as the second rear aperture, such that the first rear aperture and the second rear aperture open into the rear chamber;
  the diverting cap includes an insertion portion, inserted in the rear chamber. The insertion portion includes a flow wall extending between the first rear aperture and the second rear aperture;
  so as to form a connecting channel, delimited by the flow wall and by the rear chamber, the connecting channel thus connecting the first channel to the second channel.

In one embodiment,
  the extruded plate includes a rear chamber, extending between the rear face and the first rear aperture as well as the second rear aperture, such that the first rear aperture and the second rear aperture open into the rear chamber;

the diverting cap includes an insertion portion, inserted in the rear chamber, the insertion portion forming at least one groove, extending between the first rear aperture and the second rear aperture;

so as to form a connecting channel, delimited by the groove and by the rear chamber, the connecting channel thus connecting the first channel to the second channel.

The insertion portion may comprise two grooves, opposite from each other, each groove extending between the first rear aperture and the second rear aperture, each groove delimiting a connecting channel, together with the wall of the rear chamber, so that the device comprises two connecting channels, each connecting channel connecting the first channel to the second channel. The extruded plate may comprise an upper face and a lower face, the upper face and the lower face extending between the front face and the rear face; the insertion portion may form:

an upper groove, facing the wall of the rear chamber adjacent to the upper face;
a lower groove, facing the wall of the rear chamber adjacent to the lower face.

Preferably, the extruded plate is made of metal, preferably of aluminium or aluminium alloy and more preferably of a 6xxx aluminium alloy.

Preferably, the extruded plate is obtained by extrusion, thereby simultaneously forming the first channel, the second channel as well as each encapsulation cavity.

In one embodiment, the device comprises at least two different Phase Change Materials, and:

a same encapsulation cavity has two different mixed Phase Change Materials;
and/or two different encapsulation cavities include two different Phase Change Materials respectively.

The inlet/outlet cap may be manufactured into several pieces components permitting to close the encapsulation cavities.

Preferably, the inlet/outlet cap is a one-piece component, holding as many plugs as encapsulation cavities.

Preferably the diverting cap includes plugs permitting to close encapsulation cavities. The plugs inserted into an encapsulation cavity may be manufactured as one-piece component or several pieces components with the diverting cap.

Preferably, the diverting cap is a one-piece component, holding as many plugs as encapsulation cavities, as well as the insertion piece.

Another object of the invention is a battery box, comprising a device according to the first object of the invention.

Further advantages and characteristics will appear more clearly from the description that follows of particular embodiments of the invention, given by way of non-limiting examples, and represented in the figures listed below.

FIGURES

DESCRIPTION

Figure 1A:
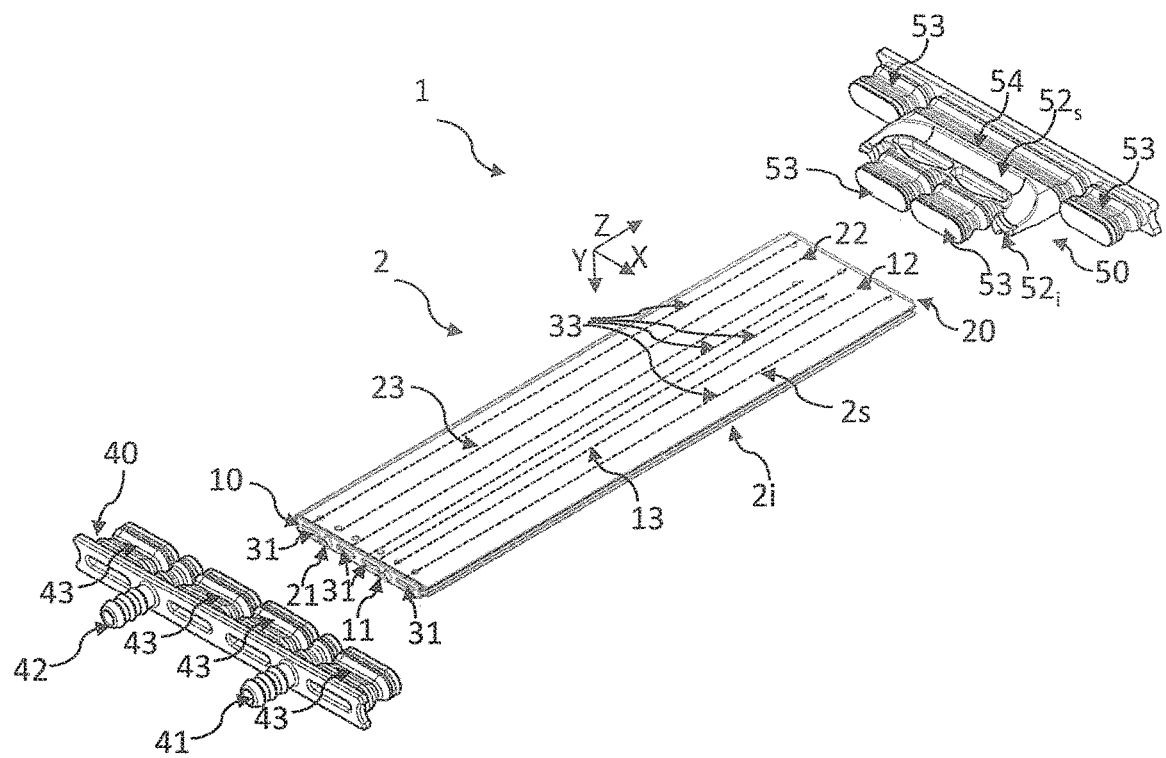
FIGS. 1A, 2A, 2B and 2C show an example of device according to the invention.

FIGS. 1A and 2A, 2B and 2C represent an example of device 1 according to the invention. The device 1 forms part of a thermal management system for a battery. It can form a wall of a battery box, or be disposed inside a battery box. The battery box is designed to be operated into a vehicle.

The device 1 includes an extruded plate 2, extending in parallel to a longitudinal axis Z. Along the longitudinal axis Z, the extruded plate extends over a length L. The extruded plate 2 extends, in perpendicular to the longitudinal axis Z, along a lateral axis X and a transverse axis Y. The extruded plate extends, along the lateral axis X, over a width l. The extruded plate extends, along the transverse axis Y, over a thickness $\varepsilon$. The width Z is lower than the length L. The thickness $\varepsilon$ is lower than the width l.

When the extruded plate is operated, the longitudinal axis Z can be either parallel or non parallel to the longitudinal axis T of the vehicle where (T, U, V) corresponds to the local referential of the vehicle and where T corresponds to the longitudinal axis of the vehicle, U the transverse axis, perpendicular to T axis and V the vertical axis to the surface formed by the axis T and U.

The thickness $\varepsilon$ can be higher than 5 mm, and be for example between 5 mm and 10 cm. The width l can be higher than 3 cm, and be for example between 3 cm and 50 cm. The length L can be higher than 10 cm, and be for example between 10 cm and 250 cm, preferentially between 10 cm and 100 cm.

The extruded plate 2 is metallic, and more particularly made up of an aluminium alloy, preferably a 6XXX alloy.

The extruded plate 2 is obtained by extrusion.

The extruded plate 2 is delimited, along the longitudinal axis Z, by a front face 10 and a rear face 20, the front and rear faces extending in perpendicular to the longitudinal axis Z. The extruded plate 2 includes a first channel 13 and a second channel 23. The first channel 13 and the second channel 23 are intended to allow a flow of a coolant, so as to achieve thermal regulation of the extruded plate 2. The plane $P_{XY}$ perpendicular to the longitudinal axis Z, is designated by the term lateral plane. The first channel 13 and the second channel 23 extend rectilinearly, parallel to the longitudinal axis Z. The extruded plate 2 is delimited by an upper face 2s and a lower face 2i. The upper face 2s and the lower face 2i extend between the front face 10 and the rear face 20, in parallel to the lateral axis X and the longitudinal axis Z. The plane $P_{XZ}$, along which the upper and lower faces extend, is designated by the term longitudinal plane.

The first channel 13 extends between a first front aperture 11, opening to the front face 10, and a first rear aperture 12, opening to the rear face 20. By open to a face, whether it is the front face or the rear face, it is meant to open to the face or in proximity of the face, at a distance lower than 5 cm or 10 cm from the face. The second channel 23 extends between a second front aperture 21, opening to the front face 10, and a second rear aperture 22, opening to the rear face 20. By aperture, whether it is on the front or rear face and corresponds to a channel aperture or encapsulation cavity aperture, said aperture is either obtained directly after extrusion or machined to obtain proper aperture dimension permitting the insertion of the plug 43.

The extruded plate 2 also includes at least one encapsulation cavity 33, intended to receive a Phase Change Material (PCM). A PCM is a material used to store heat during a phase change, in particular during a liquefaction thereof. A PCM can be a paraffin, as described in P. Schossig "Microencapsulated phase-change materials integrated into construction materials", Solar Energy Materials & Solar Cells 89 (2005) 297-306. The encapsulation cavity 33 enables the PCM to be encapsulated. As for the channels 13 and 23, the encapsulation cavity 33 extends in parallel to the longitudinal axis Z. In the example represented in FIG. 1A, the extruded plate 2 includes four encapsulation cavities 33 extending in parallel to each other. Each encapsulation cavity 33 is provided in parallel to the channels 13 and 23. The extrusion of the extruded plate 2 enables the encapsulation cavities 33 and the channels 13 and 23 to be simultaneously obtained. This enables an extruded plate 2 to be obtained according to a cheap and economical manufacturing method, and suitable for a mass production, at industrial rates.

The encapsulation cavity 33, or each encapsulation cavity 33, extends between a first front cavity aperture 31, opening to the front face 10, and a second rear cavity aperture 32, opening to the rear face 20.

The extruded plate 2 can include two different types of PCM materials, such that two different encapsulation cavities include two different PCM materials respectively. According to one alternative, a same encapsulation cavity can have two different mixed PCM materials. The two different PCM materials have preferably different melting temperatures. Preferably, the difference between both melting temperatures is higher than or equal to at least 5 C. The melting temperatures of each PCM are advantageously between 25° C. and 70° C. For example, a first PCM material can have a melting temperature between 25° C. and 40° C., whereas a second PCM material can have a melting temperature between 15° C. and 30° C.

Resorting to three or four PCM materials is also contemplatable. Different PCM materials can be disposed in a same encapsulation cavity, by being mixed, or each encapsulation cavity can contain only one PCM, the PCM encapsulated in a cavity being different from the PCM encapsulated in another cavity.

Figure 2A:
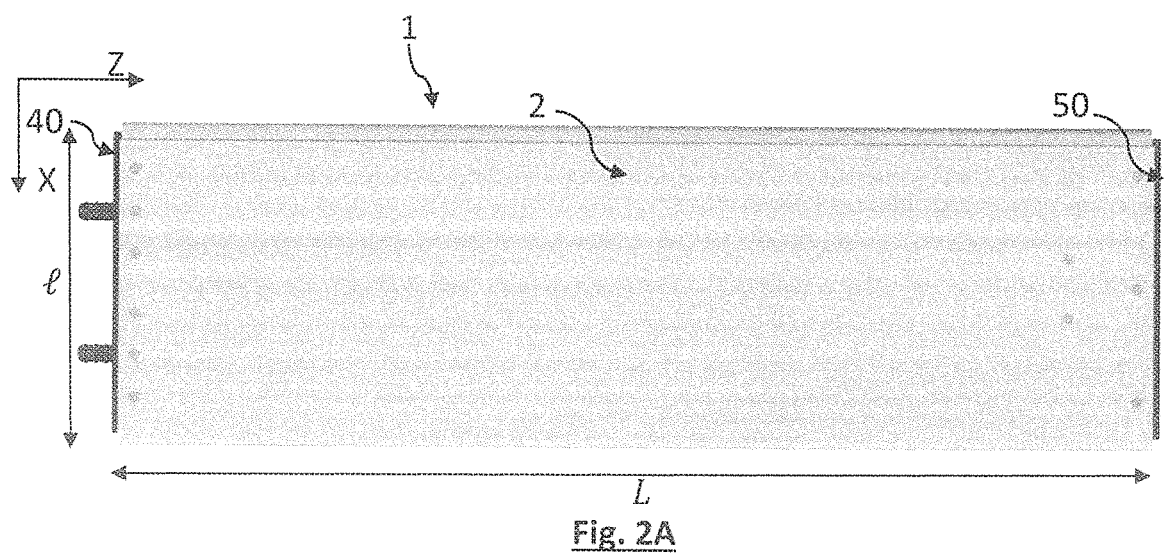
Figure 2B:
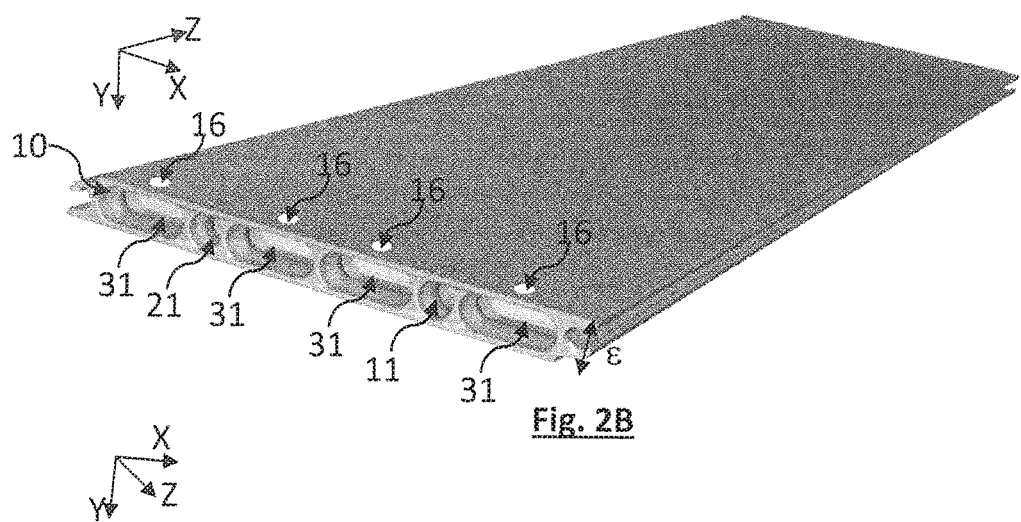

FIG. 2B shows a detail of the front face 10. A first front aperture 11 is distinguished, forming one end of the first channel 13, a second front aperture 21, forming one end of the second channel 23, as well as four first front cavity apertures 31, each forming one end of an encapsulation cavity 33.

Figure 2C:
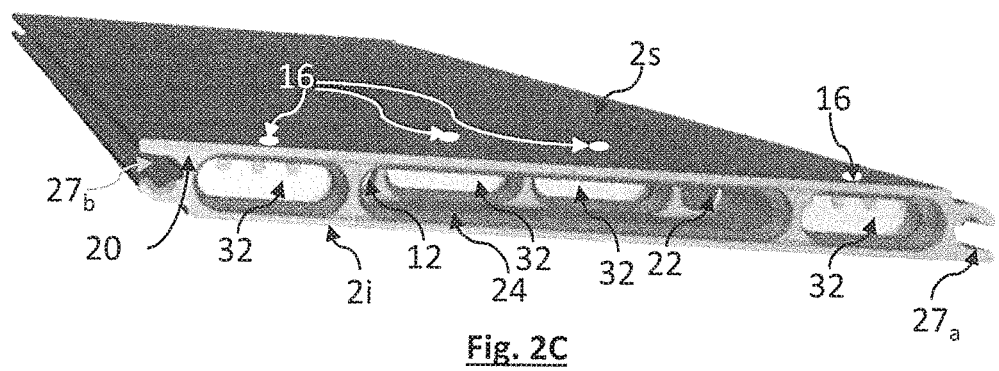

FIG. 2C shows a detail of the rear face 20. A first rear aperture 12 is distinguished, forming one end of the first channel 13, a second rear aperture 22, forming one end of the second channel 23, as well as four first rear cavity apertures 32, each forming one end of an encapsulation cavity 33. The first rear aperture 12 and the second rear aperture 22 open into a rear chamber 24, extending from the rear face 20. Thus, the first rear aperture 12 and the second rear aperture 22 are disposed recessed from the rear face 20. The first channel 13 and the second channel 23 open into the rear chamber 24.

Figure 1B:
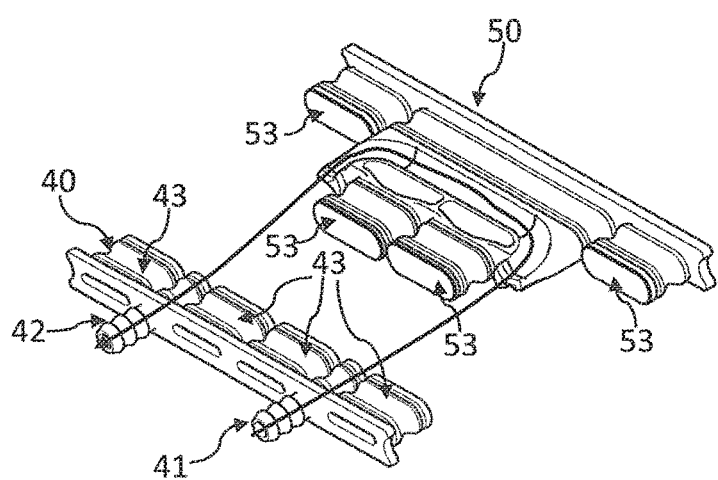
FIG. 1B illustrates an inlet/outlet cap and a diverting cap, being part of the device.

As represented in FIGS. 1A and 2A, the device 1 includes an inlet/outlet cap 40, applied against the front face 10, and a diverting cap 50, applied against the rear face 20. FIG. 1B shows a detail of the inlet/outlet cap 40 and of the diverting cap 50, as well as the coolant circulation through the inlet/outlet cap and the diverting cap, as described hereinafter.

The function of the inlet/outlet cap 40 is to close the front aperture 31 of each encapsulation cavity 33, while allowing the inlet of the coolant into the first channel 13 and the outlet of the coolant in the second channel 23. The inlet/outlet cap includes front plugs 43, intended to seal each front aperture 31 of the encapsulation cavity. Each front plug 43 is engaged in an encapsulation cavity 33, through the front aperture 31. The inlet/outlet cap 40 includes a fluid connector 41 engaged in the first front aperture 11, so as to connect the first channel 13 with an upstream fluid circuit. The inlet/outlet cap 40 includes a fluid connector 42 engaged in the second front aperture 21 so as to connect the second channel 23 with a downstream fluid circuit. In the example represented in FIGS. 1A and 1B, the inlet/outlet cap 40 includes four front plugs 43.

The function of the diverting cap 50 is to close the rear cavity aperture 32 of each encapsulation cavity 33, while allowing the coolant to be diverted from the first channel 13 to the second channel 23.

As for the inlet/outlet cap 40, the diverting cap 50 includes a plug, designated by the term rear plug 53, to seal each encapsulation cavity 33. The diverting cap is intended to be introduced in the extruded plate 2 so as to form at least one connecting channel, for connecting the first channel 13 to the second channel 23. This aspect is more widely described in connection with FIGS. 5A, 5B and 5C and also in FIGS. 6A and 6B. In the example represented in FIGS. 1A and 1B, the diverting cap 50 includes four rear plugs 53.

Figure 3:
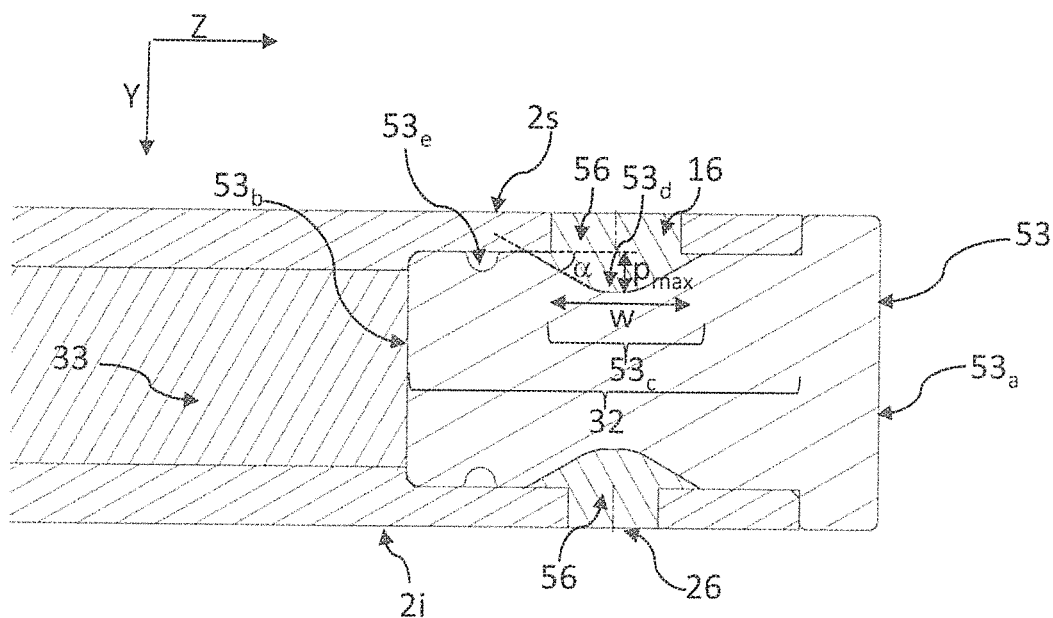
FIG. 3 shows an example of plug for sealing a cavity for encapsulating the device represented in FIG. 1A as well as FIGS. 2A to 2C.

FIG. 3 represents a cross-section of a rear plug 53, being part of the diverting cap 50. The plane $P_{YZ}$, perpendicular to the lateral axis X, is designated by the term transverse plane. The cross-section is made along the thickness of the extruded plate 2, along the transverse plane $P_{YZ}$. The front plugs 43, belonging to the input/output cap 40, have a structure analogous to that of the rear plugs 53. The rear plug 53 extends, along the longitudinal axis Z, so as to be inserted in an encapsulation cavity 33, through its rear aperture 32. The material of the rear plug is sufficiently flexible to be slightly deformable upon inserting in the encapsulation cavity. Once it is inserted, the rear plug forms a waterproof sealing for the encapsulation cavity.

The rear plug 53 is delimited, along the longitudinal axis Z, by a first end $53_a$ and a second end $53_b$. At these ends, the plug has, along the transverse plane $P_{YZ}$, a transverse surface corresponding to a cross-section of the encapsulation cavity 33. Between the first end and the second end, the plug has a recess $53_b$. The recess is annular. The transverse surface of the recess $53_c$ is lower than the transverse cross-section of the encapsulation cavity 33 or the rear aperture 32, in which the plug 53 is inserted. In the example represented in FIG. 3, the recess $53_b$ corresponds to a centre zone of the plug 53, half-way between the first end $53_a$ and the second end $53_b$. The recess $53_b$ is extending around the plug, and has a maximum depth $p_{max}$ located at $53d$ and a width W. The presence of the recess $53_b$ enables a space 56 between the plug and the encapsulation cavity 33 or the rear aperture 32. The space 56 is intended to be filled by an adhesive, in the liquid state or in the form of a gel, so as to bond the plug 53 in the cavity 33 after being inserted through the rear aperture 32.

The maximum depth $p_{max}$ depends on the plug dimension. When the plug thickness, along the transverse plane $P_{YZ}$, is 20 mm, the maximum depth of the recess $53_c$ can be between 2 mm and 5 mm. Preferably, the maximum depth of the recess is higher than 10% the plug thickness in the transverse plane $P_{YZ}$.

The width W depends on the plug dimension. When the plug length, along the Z axis direction is 30 mm, the width W can be between 3 mm and 15 mm. Preferably, the width of the recess is higher than 10% the plug length along the Z axis direction.

Figure 4:
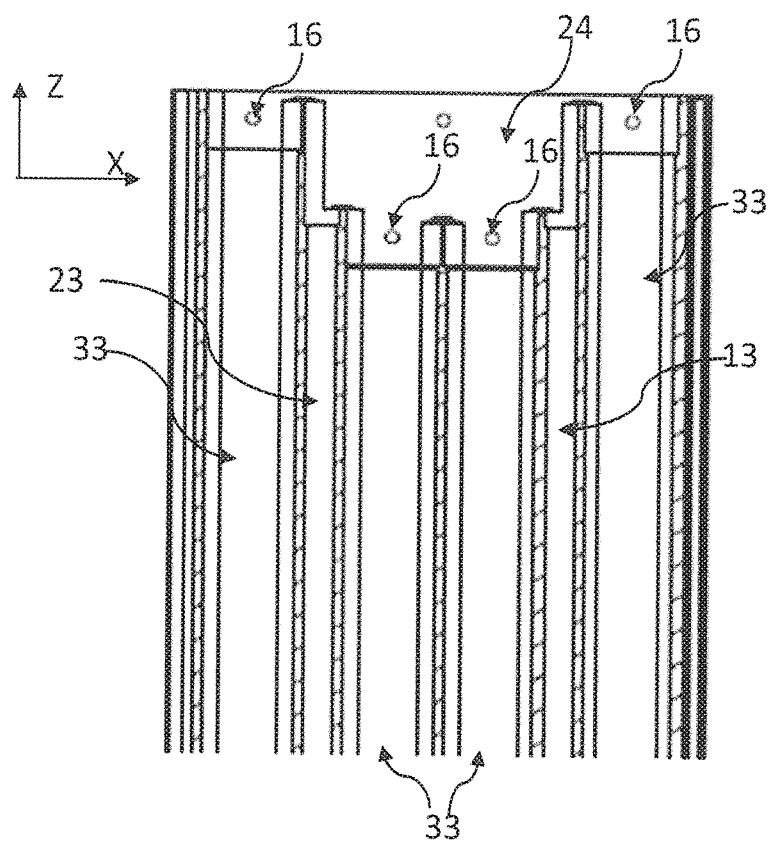
FIG. 4 illustrates a top partial view of an extruded plate represented in FIGS. 1A, 2A to 2C.

The adhesive is introduced, preferably by injection, through an inlet aperture 16 provided in the extruded plate 2, and for example in the upper face 2s or in the lower face 2i. The inlet aperture 16 is provided above or below the position, in the encapsulation cavity, of the notch $53_d$. The inlet aperture 16 opens into the recess $53_c$. Inlet apertures 16, respectively corresponding to four rear plugs of the diverting cap 50, are represented in FIG. 4. The extruded plate 2 can include a discharge aperture 26, provided in the upper face 2s or the lower face 2i, above or below the notch 53d, to enable the adhesive to be discharged. The discharge aperture 26 opens into the recess $53_c$. This way, the adhesive penetrates around the notch through the inlet aperture 16, and then comes out through the discharge aperture 26. It is preferable that the inlet aperture 16 is provided in the upper face 2s and that the discharge aperture 26 is provided in the lower face 2i, as represented in FIG. 3, or conversely. Preferably, discharge aperture and inlet apertures are obtained by performing a hole in the extruded plate. In this embodiment, the diameter of the discharge aperture 26 is lower than the diameter of the inlet aperture 16, which enables the adhesive to be retained around the plug 53, by forming a head loss. Other geometries of inlet and discharge aperture are also possible according to the invention, such as elliptic apertures for instance. Here, the section of the discharge aperture 26 is preferably lower than the section of the inlet aperture 16.

The notch geometry is preferably optimised to maximise the contact surface between the adhesive and the inner wall of the encapsulation cavity 33. Hence, the slope formed by the notch, with respect to the longitudinal axis Z, forms an acute angle α, preferably lower than 60°. This increases the contact surface between the adhesive and the inner wall of the encapsulation cavity 33. This enables an efficient bonding of the plug 53 in the encapsulation cavity 33 or in the rear cavity aperture 32 to be obtained in the presence of defect in the adhesive, for example as a result of an insufficient filling of the space 56 or by shrinkage upon drying the adhesive, or even as a result of thermal expansion effects of the adhesive. Otherwise said, in the recess $53_c$, the external surface of the plug 53 is inclined, with respect to the longitudinal axis Z, according to an acute angle α lower than 90° and preferably lower than 60°.

The plug 53 can include auxiliary recesses $53_e$, to prevent excess adhesive or a thermal expansion thereof. The excess adhesive can thereby overflow from the notch $53_d$ to be confined in an auxiliary recess. An auxiliary recess $53_e$ can be disposed between the notch $53_d$ and the first end $53_a$, and/or between the notch $53_d$ and the second end $53_b$.

The particular structure of the plug 53, as described in connection with FIG. 3, enables the diverting cap 50 and/or of the inlet/outlet cap 40 to be assembled in a particular robust and sustainable way to the extruded plate 2. The assembly obtained is thus resistant against shock, mechanical vibration or significant temperature variations.

FIG. 4 shows a top view of the extruded plate 2, at the rear face 20. The inlet apertures 16 provided in the upper face 2s are distinguished. Each inlet aperture 16 opens into an encapsulation cavity 33. The rear chamber 24, in which the first channel 13 and the second channel 23 open is also observed.

An important function of the diverting cap 50 is to ensure fluid communication between the first channel 13 and the second channel 23. Indeed, the first channel 13 and the second channel 23 are rectilinear. This is due to the fact that they are obtained by extrusion. The diverting cap 50 allows fluid interconnection between the first channel 13 and the second channel 23. To that end, the diverting cap includes an insertion portion 54, intended to be inserted in the rear chamber 24 provided in the extruded plate 2.

Figure 5A:
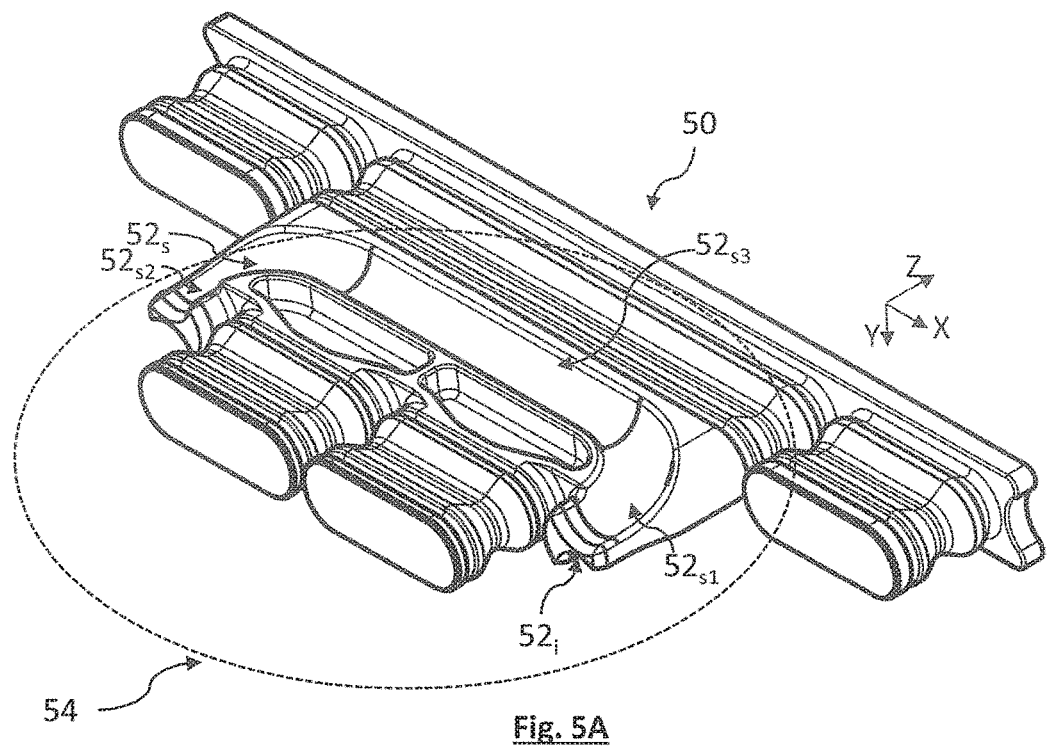
FIGS. 5A, 5B and 5C are schemes of a diverting cap forming this device.

The insertion portion 54 is surrounded by a dash line in FIG. 5A. The insertion portion 54 forms an upper groove $52_s$, extending from the first rear aperture 12 to the second rear aperture 22. In parallel to the longitudinal plane $P_{XZ}$, the upper groove $52_s$ forms a U. The upper groove $52_s$ extends facing the inner wall of the rear chamber 24 adjacent to the upper face 2s. The upper groove $52_s$ includes:

a first upper region $52s_1$, extending in parallel to the longitudinal axis Z, or substantially in parallel to the same, and disposed against the first rear aperture 12, in the continuity of the same;

a second upper region $52s_2$, extending in parallel to the longitudinal axis Z, or substantially in parallel to the same, and disposed against the second rear aperture 22, in the continuity of the same;

an upper lateral region $52s_3$, extending in parallel to the lateral axis X, or substantially in parallel to the same, between the first upper region $52s_1$ and the second upper region $52s_2$.

Figure 5B:
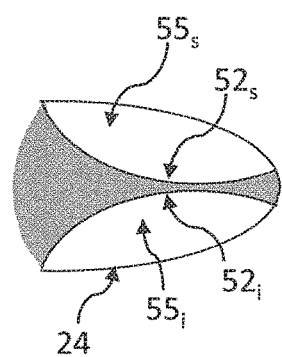
Figure 5C:
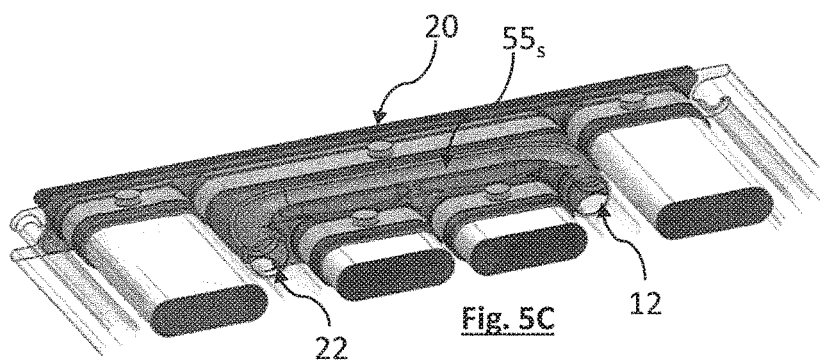

When the diverting cap 50 is introduced in the extruded plate 2, the insertion portion 54 is inserted in the rear chamber 24. An upper connecting channel $55_s$ is thus formed. As represented in FIG. 5B, this upper connecting channel $55_s$ is delimited by the upper groove $52_s$ on the one hand, and by the wall of the rear chamber 24 on the other hand. It enables the first channel 13 to be connected to the second channel 23. This allows a coolant flow between the first front aperture 11 and the second front aperture 21, through the first channel 13, the upper connecting channel $55_s$, and the second channel 23 successively. The upper connecting channel $55_s$ is shown on FIG. 5C.

The insertion piece 54 includes a lower groove $52_i$, symmetrical to the upper groove $52_s$, with respect to a longitudinal plane $P_{XZ}$. When the diverting cap is introduced in the extruded plate 2, the lower groove $52_i$ extends facing the wall of the chamber 24 adjacent to the lower face 2i. The lower groove $52_i$ delimits a lower connecting channel $55_i$, together with the wall of the rear chamber 24. This allows a coolant flow between the first front aperture 11 and the second front aperture 21, through the first channel 13, the lower connecting channel $55_i$, and the second channel 23 successively.

Figure 6A:
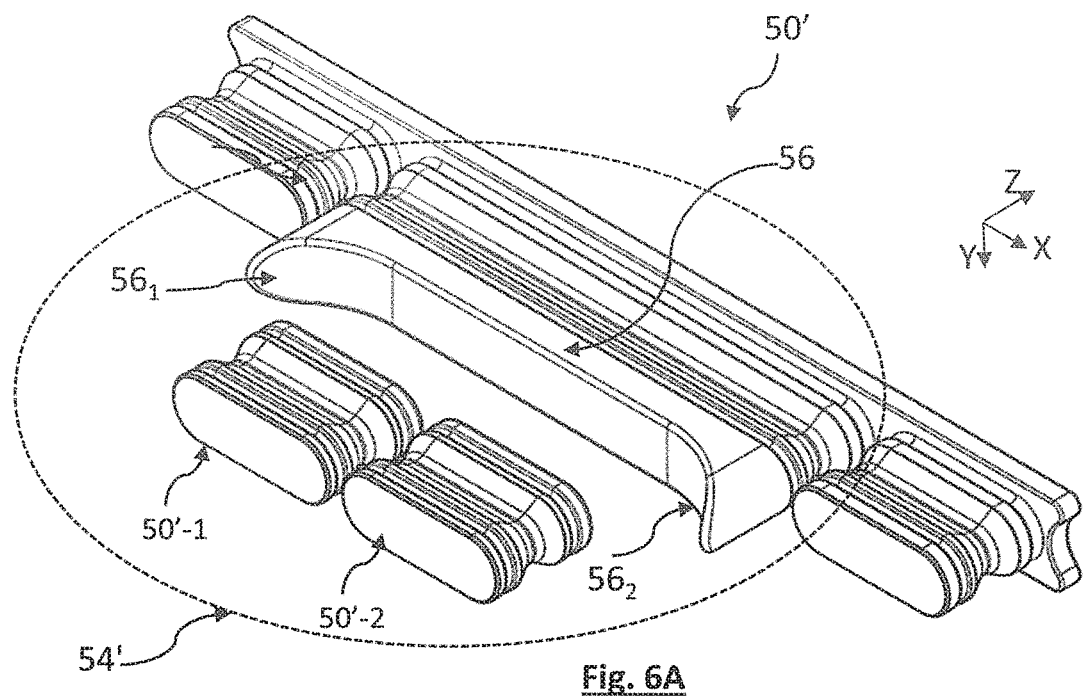
FIGS. 6A, 6B are schemes of a diverting cap forming of device according to the invention
Figure 6B:
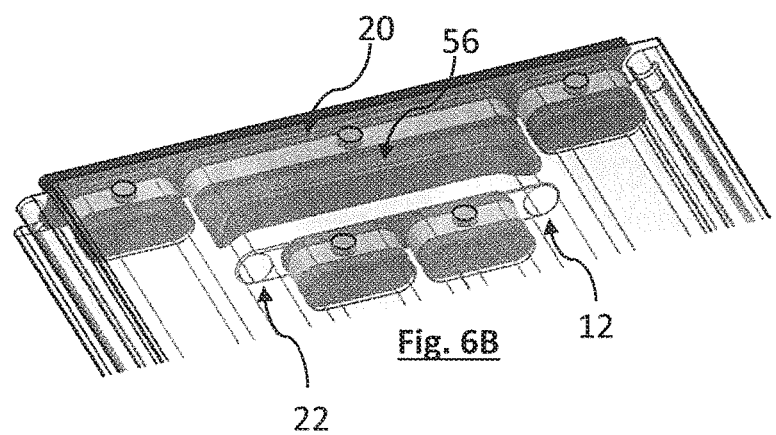

FIG. 6A shows a particular embodiment where the diverting cap 50' is made in three pieces components 54', 50'-1, 50'-2 where 54' corresponds to the insertion portion, 50'-1 and 50'-2 correspond to plugs 53. In another particular embodiment, the diverting cap 50' is made in two pieces components where the plug 53 is only one-piece component.

In the example represented in FIG. 6A, the diverting cap 50' includes four rear plugs 53, two of each being one piece with the diverting cap, two of each being independent piece inserted in encapsulation cavities 33.

The insertion portion 54' is surrounded by a dash line in FIG. 6A. The insertion portion 54' includes a flow wall 56, extending from the first rear aperture 12 to the second rear aperture 22. In parallel to the longitudinal plane $P_{XZ}$, the flow wall forms a U. The flow wall 56 extends facing the inner wall of the rear chamber 24. The flow wall 56 includes:

a first region 56₁, extending in parallel to the longitudinal axis Z, or substantially in parallel to the same, and disposed against the first rear aperture 12, in the continuity of the same;

a second region 56₂, extending in parallel to the longitudinal axis Z, or substantially in parallel to the same, and disposed against the second rear aperture 22, in the continuity of the same;

a lateral region 56₃, extending in parallel to the lateral axis X, or substantially in parallel to the same, between the first upper region 56₁ and the second upper region 56₂.

When the diverting cap 50' is introduced in the extruded plate 2, the insertion portion 54' is inserted in the rear chamber 24. A connecting channel 55' is thus formed. It enables the first channel 13 to be connected to the second channel 23. This allows a coolant flow between the first front aperture 11 and the second front aperture 21, through the first channel 13, the connecting channel 55', and the second channel 23 successively. The connecting channel 55' is shown on FIG. 5B.

The particular structure of the diverting cap 50,50' enables a fluid connection to be ensured between the first channel 13 and the second channel 23, the latter being rectilinear because of their extrusion manufacture method. The use of the diverting cap 50,50' enables a fluid circuit to be made in the extruded plate by a simple, robust and economical method. Indeed, the diverting cap 50,50' and the inlet/outlet cap 40 can be obtained by known manufacture methods, for example thermoforming.

The diverting cap 50,50' includes plugs permitting to close encapsulation cavities. The plugs 53 inserted into an encapsulation cavity 33 may be manufactured as one-piece component or several pieces component with the diverting cap 50,50'.

Preferably, the rear plugs 53 are secured to the diverting cap 50 before the latter is secured to the extruded plate 2. Accordingly, the diverting cap 50 is a one-piece component, including the insertion piece 54 as well as the rear plugs 53.

Preferably, the front plugs 43 are secured to the inlet/outlet cap 40 before the latter is secured to the extruded plate 2. Accordingly, the inlet/outlet cap 40 is a one-piece component.

In one embodiment, the rear plugs 53 are manufactured independently from the insertion piece 54,54'. The diverting cap 50,50' is thus obtained after the rear plugs have been inserted into the encapsulation cavities 33, and after the insertion piece 54,54' has been inserted into the rear chamber 24.

The diverting cap 50,50', as well as the inlet/outlet cap 40 may be casted, so that each casted cap is a one-piece component.

The material of the diverting cap 50,50' and the inlet/outlet cap 40 may be aluminium which has a good adhesive behaviour and is recyclability or a plastic, the thermal expansion of which being close to the thermal expansion of aluminium. Preferably it is made of polyketone (PK).

A device 1 according to the invention can be made easily, by assembling the extruded plate 2 to the diverting cap 50,50' or to the inlet/outlet cap 40. The PCM is then introduced into each encapsulation cavity. Closing each encapsulation cavity by the diverting cap or the inlet/outlet cap enables the PCM to be confined. The confinement of the PCM being obtained by the insertion of a plug into encapsulation cavity. The connection between each cap and the extruded plate 2 can be enhanced by the use of an adhesive, inserted by inlet aperture as described in connection with FIG. 3. The adhesive thereby extends around the plugs having a local recess. As previously described, this enables a robust and compatible assembly to be obtained with a use under stringent mechanical conditions (shock, vibration), as well as under thermal conditions that can also be harsh.

In one embodiment, at least two different Phase Change Materials can be introduced in the same encapsulation cavity. In another embodiment, two different Phase Change Materials can be introduced into two different encapsulation cavities.

The device 1 can form part of a battery box, or be disposed inside a battery box.

Several devices 1 can be juxtaposed together to form part of a battery box, or be disposed inside a battery box.

In one embodiment, the extruded plate 2 can present connecting means (27a, 27b) to fasten together one device 1 to one other device.

The invention claimed is:

1. A thermal management device for a battery box, comprising:
    an extruded plate extending along a longitudinal axis between a front face and a rear face, the extruded plate including:
        a first channel extending between the front face and the rear face, between a first front aperture and a first rear aperture;
        a second channel extending between the front face and the rear face, between a second front aperture and a second rear aperture;
        the first channel and the second channel being configured to form a fluid circuit for a coolant to flow through;
    at least one encapsulation cavity extending between the front face and the rear face, the encapsulation cavity being configured to encapsulate a phase change material;
    an inlet/outlet cap including at least one plug, inserted into at least one encapsulation cavity at the front face;
    a diverting cap including at least one plug inserted into at least one encapsulation cavity at the rear face;
    the diverting cap forming a connecting channel connecting the first rear aperture to the second rear aperture so as to connect the first channel and the second channel such that the coolant can flow between the first front aperture and the second front aperture successively through the first channel the connecting channel, and the second channel.

2. The device according to claim 1, wherein the first channel and the second channel extend in the extruded plate along a rectilinear direction, and in parallel to the longitudinal axis.

3. The device according to claim 1, wherein:
    at least one plug inserted into an encapsulation cavity extends, along the longitudinal axis between a first end and a second end the plug including a recess between the first end and the second end;
    the extruded plate includes an inlet aperture opening into the recess of the plug to allow an adhesive inlet;
    such that the adhesive extends around the plug in the recess to assemble the plug to the extruded plate.

4. The device according to claim 3, wherein the extruded plate includes a discharge aperture opening into the recess of the plug to allow adhesive discharge.

5. The device according to claim 4, wherein the diameter of the discharge aperture is lower than the diameter of the inlet aperture.

6. The device according to claim 3, wherein the recess forms an acute angle with respect to the longitudinal axis.

7. The device according to claim 3, wherein the plug includes at least one auxiliary recess extending around the plug, between the recess and the first end, or between the recess and the second end.

8. The device according to claim 1,
wherein the extruded plate includes a rear chamber extending between the rear face and the first rear aperture, as well as the second rear aperture, such that the first rear aperture and the second rear aperture open into the rear chamber; and
wherein the diverting cap includes an insertion portion, inserted in the rear chamber, the insertion portion forming at least one groove extending between the first rear aperture and the second rear aperture;
so as to form a connecting channel delimited by the groove and by the rear chamber, the connecting channel thus connecting the first channel to the second channel.

9. The device according to claim 8, wherein the insertion portion comprises two grooves opposite from each other, each groove extending between the first rear aperture and the second rear aperture, each groove delimiting a connecting channel, together with the wall of the rear chamber, so that the device comprises two connecting channels each connecting channel connecting the first channel to the second channel.

10. The device according to claim 9, wherein the extruded plate comprises an upper face and a lower face, the upper face and the lower face extending between the front face and the rear face, and wherein the insertion portion forms:
an upper groove facing the wall of the rear chamber adjacent to the upper face;
a lower groove facing the wall of the rear chamber adjacent to the lower face.

11. The device according to claim 1, wherein the extruded plate is made of aluminium or aluminium alloy.

12. The device according to claim 1, wherein the inlet/outlet cap and/or the diverting cap is a one-piece component.

13. The device according to claim 1, comprising at least two different Phase Change Materials, and wherein:
a same encapsulation cavity has two different mixed Phase Change Materials; and/or
two different encapsulation cavities include two different Phase Change Materials.

14. The device, according to claim 1, wherein the inlet/outlet cap includes a fluid connector engaged in the first front aperture permitting a connection of the first channel with an upstream fluid circuit, and a fluid connector engaged in the second front aperture, permitting a connection of the second channel with a downstream fluid circuit.

15. A battery boxy comprising the device according to claim 1.

* * * * *